March 9, 1926.
W. R. COLEMAN
1,575,973
SHOCK ABSORBER, DASHPOT, AND THE LIKE
Original Filed Jan. 3, 1922
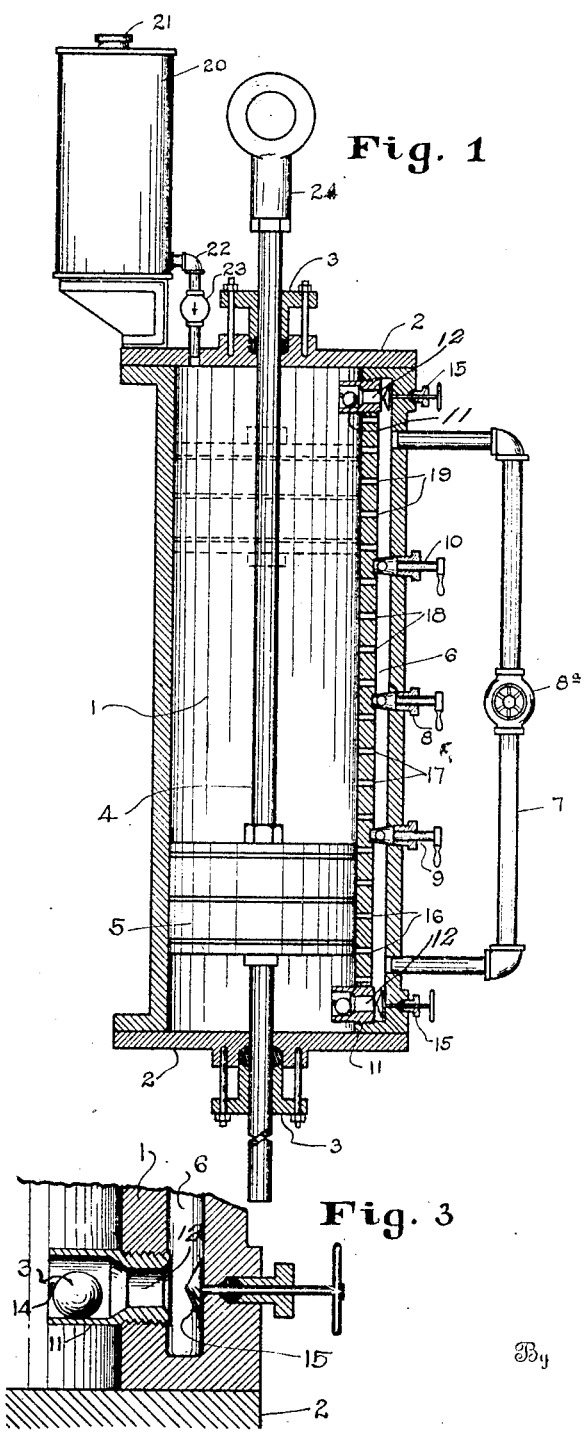
Fig. 1
Fig. 3
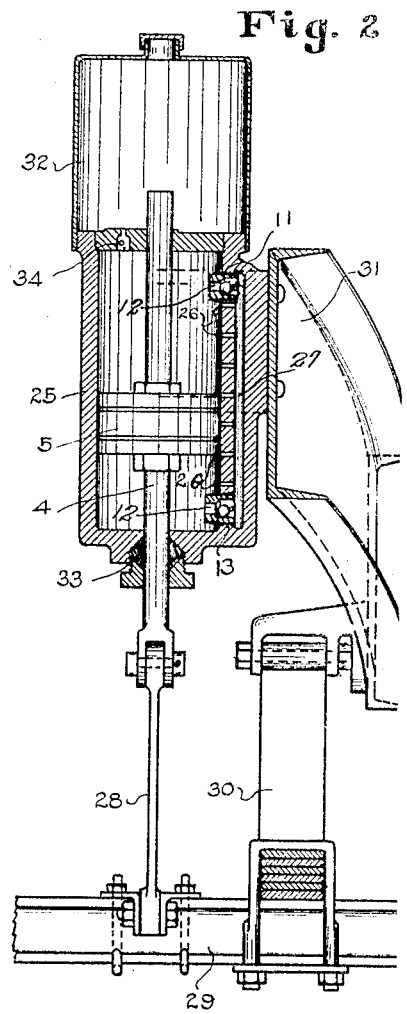
Fig. 2
Inventor
W. R. Coleman.

Patented Mar. 9, 1926.

1,575,973

UNITED STATES PATENT OFFICE.

WILLIAM R. COLEMAN, OF BIRMINGHAM, ALABAMA.

SHOCK ABSORBER, DASHPOT, AND THE LIKE.

Application filed January 3, 1922, Serial No. 526,849. Renewed May 8, 1925.

*To all whom it may concern:*

Be it known that I, WILLIAM R. COLEMAN, a citizen of the United States of America, residing at Birmingham, in the county of Jefferson and State of Alabama, have invented certain new and useful Improvements in Shock Absorbers, Dashpots, and the like, of which the following is a specification.

My invention relates to a shock absorber, dash-pot or like cushioning means employing a fluid for the purpose of retarding and stopping without objectionable recoil a moving element.

As applied to a shock absorber, wherein the appliance must function in conjunction with a spring both to arrest the momentum of the vehicle and to counteract the reaction of its springs, I have conceived the idea of so designing the shock absorber that it will apply a high initial and gradually decreasing resistance to the momentum of the load, which resistance preferably will be to a measurable degree proportionate to the gradually increasing resistance of the springs to the load and which, on the return stroke, will initially oppose its maximum resistance to the reaction of the spring, such resistance decreasing gradually as the spring relaxes. The result of this co-ordination of the shock absorber and the spring is to produce a gradual cushioning of the body movement downwardly and a practical elimination of a rebound.

As applied to dash-pots, where the action of the latter is not co-ordinated with a spring, I contemplate so designing the mechanism that I can produce, by varied manipulation of by-pass valves, any desired control of the movement of the dash-pot piston throughout any desired portion of its travel in either direction and by such means I make the appliance so thoroughly flexible and adaptable that it can accommodate itself to any retarding and stopping function that may be required of it, and moreover it will stop always without an objectionable recoil.

My invention, which I have illustrated typically as a dash-pot and as a shock absorber, is capable of wide variation in design and proportion according to the duty contemplated.

The accompanying drawings however are sufficiently illustrative of the principles governing the construction and operation of the appliance to enable those skilled in the art to thoroughly understand and practice the same.

Fig. 1 is a longitudinal cross-sectional view illustrating a dash-pot capable of adaptation and adjustment to produce many different operating functions.

Fig. 2 is a similar view of a shock absorber shown in association with a conventional vehicle spring.

Fig. 3 is an enlarged sectional view showing a reversible check valve in detail.

Similar reference numerals refer to similar parts throughout the drawings.

In the embodiment of my invention as a dash-pot illustrated in Fig. 1, I show a cylinder 1 having ends 2 provided with stuffing boxes 3 for the piston rod 4 upon which is mounted the piston 5 that travels with a fluid tight fit in the bore of the cylinder. I provide lengthwise of the cylinder a by-pass 6 which extends from end to end of the cylinder and is preferably formed in the cylinder casting. I connect the ends of this by-pass 6 with an external by-pass 7 having a control valve 8$^a$ therein. I interrupt the flow of fluid through the by-pass 6 by any desired number of spaced valves, the drawing showing a central valve 8 and valves 9 and 10 disposed substantially midway between the valve 8 and the ends of the piston's travel. At each end of the cylinder I provide a check valve formed by a threaded sleeve 11 having therein a bevel seat surrounding the by-pass port 12 for a ball check valve 13 which is held in the sleeve by a cross pin 14. The end of the port 12 opening into the by-pass 6 is bevelled to form a seat for a valve 15 which is adapted when screwed in to shut off the flow of liquid through the by-pass port. The check valve sleeves are threaded at each end so that they can be reversed, thereby causing the check valve to open inwardly or outwardly according to the action desired.

I provide the cylinder with a longitudinal series of ports preferably extending the full length thereof between the check valves and being equi-distantly spaced and set so as to be divided by the valves 8, 9 and 10 into four groups of an approximately equal number of ports. For the sake of clearness of description, the ports in the groups reading from left to right are designated 16, 17, 18 and 19, and all of these ports open into the by-pass 6 and are adapted to be brought into communication with each other through said by-pass or to be segregated by the operation of the valves 8, 9 and 10. The length of the piston should be such as to overlap all but one port of the end groups and all ports of each intermediate group so that in passing over any intermediate group of ports the fluid in the cylinder will not by-pass the piston through them. I provide an oil reservoir 20 having a removable top 21 and having at its bottom a connection with the cylinder through the duct 22, which is provided with a ball check valve 23 adapted to open towards the cylinder and normally closed by the pressure in the cylinder, but which will open when the cylinder is not entirely full of liquid and automatically supply the same. The duct enters the upper end of the cylinder so that it can perform the additional function of allowing any air which gains access to the cylinder to escape therefrom. I show the piston rod 4 having attached at one end a coupling member 24 which is typical of any means for connecting it to the work.

In the operation of the dash-pot, as thus described, assuming the valves 8, 9 and 10 closed and the valve $8^a$ open to the desired extent, the by-passing of the fluid is entirely under control of valve $8^a$ subject however to the automatic action of the piston itself, throughout its terminal zone of travel in either direction, in closing successively the ports 16 or 19 and thus retarding the escape of the fluid from the cylinder through by-passes 6 and 7. Assuming that the cross-sectional area of the by-pass ports 12 and the ports 16 or 19 is sufficiently large to permit, when all are open, a free by-passing of the fluid around the piston when valve $8^a$, which is amply large to by-pass all fluid flowing through any or all groups of ports, is sufficiently open for that purpose, the piston will have a free start in either direction, if the check valve port is open and the valve set to open inwardly. The check valve ports like valve $8^a$ should be large enough to pass freely all the fluid that the cylinder ports will admit to or discharge from the by-pass. If the valve is set to open outwardly or its port is closed by valve 15, the piston will have a retarded start due to the fact that the fluid will by-pass with increasing rapidity as the piston uncovers the ports behind it. When the check valves are set in this way the piston must not move to cover the end port of the end series 16 or 19. With either free or retarded start, however, the piston will travel freely throughout the intermediate zone of its travel until it commences to cover the ports 16 or 19 according to the terminus it is approaching. As it cuts off these ports the fluid is trapped ahead of it and forms a fluid cushion which offers an increasing resistance until the piston is brought to rest without appreciable recoil at the terminus of its travel. The speed of the piston's intermediate travel is responsive to the extent to which the valve $8^a$ is opened and thus it may be caused to move at the desired rate throughout what may be termed its free travel.

If it be desired to have the intermediate travel of the piston independent of the valve $8^a$ this can be accomplished by opening the valve 8, whereupon the valve can by-pass the fluid through ports 17 and 18 and by-pass 6 without coming under the influence of the valve $8^a$ until it passes beyond the ports 17 or 18 when it again comes under the control of the valve $8^a$.

If it be desired to release the piston from the control of the valve $8^a$ at either or both ends of its stroke, this is accomplished by opening the valves 9 or 10 or both of them in which case the fluid can by-pass the piston through the ports 16 and 17 and the by-pass 6 at one end and through the ports 16 and 19 and the by-pass at the other end. Under such conditions it is understood that valve 8 will be closed.

To make the piston throughout its travel independent of the valve $8^a$ it is only necessary to open the valves 8, 9 and 10, whereupon the fluid will by-pass through the adjacent groups of ports and the by-pass 6 leaving the piston free for intermediate travel and free or retarded for initial or terminal travel according to the action of the check valves. Under such conditions the by-pass 7 and the valve $8^a$ could be dispensed with.

From the foregoing description it will be seen that the piston in all cases will be brought to stop with a graduated cushioning effect and without recoil provided the check valves are set to open inwardly, but wherever one of the check valves is set to open outwardly the piston approaching it will move with substantial freedom to the terminus of its stroke, being only retarded by the extent to which the closing of the terminal series of ports 16 or 19 may trap the fluid ahead of it, notwithstanding that the by-pass ports 12 are both open. It is to be understood that the check valves are adapted to be changed to work in either direction and either or both can be put out of service at any time by the closing of their respective valve 15. The dash-dot, as thus described, is capable in its functioning of being so widely varied that it can be adapted to any operating conditions or requirements.

In Fig. 2 I have illustrated my invention as adapted for use as a shock absorber and in this design I show a cylinder 25 having a continuous series of ports 26 extending lengthwise thereof and opening into the by-pass 27, corresponding to 6 in Fig. 1. The check valve sleeves 11 in this arrangement are reversed showing the check valves 13 opening outwardly from the cylinder into the by-pass 27. This design will give the operation as described in connection with Fig. 1 with the valves 8, 9 and 10 open and the by-pass 7 eliminated. In this arrangement the piston 5 has a piston rod 4 connected below by a link 28 to an axle 29 or like member fast to a leaf-spring 30 which is typical of any part fast to the spring while the cylinder 25 is suitably connected to the frame channel 31 which is typical of any part of the chassis or body. In this arrangement I provide an oil reservoir 32 on top of the cylinder into which the upper end of the piston rod projects at the extreme of its up travel. At the lower end of the cylinder I provide a stuffing box 33 for the piston rod. A check valve 34 controls the inflow of oil into the cylinder from the reservoir and the escape of air from the cylinder.

In the operation of this device it is to be understood that the duties required of it will be on the down stroke, to oppose with a gradually decreasing resistance to the downward movement of the piston, this fluid resistance preferably weakening proportionately as the tension increases on the spring, and on the return stroke, in like manner to oppose with gradually decreasing resistance the rebound due to the reaction of the spring, this fluid resistance being intended to decrease proportionately as the spring tension relaxes. This action is obtained in the following manner. Assuming the piston in intermediate position, which represents its normal operating position, and the area of each by-pass port 12 substantially that of all the smaller intermediate ports, if the piston starts to move in either direction in the cylinder the check valve ahead of it will open providing a free escape of the fluid ahead of it and the check valve behind it closes so that the piston's movement thereupon comes under the direct control of the ports 26 behind it. Therefore as the piston moves down toward the open check valve it gradually increases the number of open ports 26 behind it and the freedom with which the fluid can by-pass it so that automatically it gradually reduces its resistance, and this is true for either direction of movement from or towards its normal position or from any starting point in either direction. Assuming that this piston movement occurs in the direction which involves an increasing tension on the spring, the ports 26 should be designed to gradually transfer the duty of resisting the piston's movement from the shock absorber to the springs and in this manner the absorption of the shock is gradual and controlled throughout. On the return movement of the piston towards its normal or intermediate position, the action is just the same as when the piston was moving from intermediate position outwardly, because the check valve behind it will close and the check valve in front of it will open, and thus its freedom of movement is controlled by the number of ports 26 which are open behind it and as this number increases as the piston moves in any direction its resistance gradually decreases. It will be obvious that the piston must not at its extreme travel in either direction close the adjacent end port 26 as otherwise it would become locked. This gradual reduction of piston resistance preferably takes place proportionately to the relaxation of the spring, the piston's greatest power of resistance being exerted at the commencement of the spring's tendency under its highest tension to rebound. While the piston will offer its highest resistance at the commencement of its movement in any direction, it will nevertheless offer no appreciable resistance except in opposition to sudden movements, thus permitting its normal play or movement, responsive to what may be considered the normal spring action, to be practically free of effect. Moreover, the farther the piston moves from any position in either direction, the greater will be its initial resistance on its return travel, as the less will be the number of open ports behind it when it starts back.

The foregoing description of the piston's gradually decreasing resistance as it moves is desirable in a shock absorber and is obtained in part by the outwardly opening check valves. If it be desired to have the piston's resistance gradually increase as it moves, which is generally the case with dash-pots and cushioning stops, then it is only necessary to reverse the check valves, whereupon the check valve ahead of the moving piston is always closed and the check valve behind it is open. It therefore follows that the piston's resistance is controlled by the gradually decreasing number of ports that are open ahead of it and hence its resistance will gradually increase. By having the check valves open in opposite directions, the piston will offer a decreasing resistance as it moves to intermediate position in one direction and an increasing resistance as it moves on to its other terminus, but its return will be free for its entire travel as the fluid can by-pass freely through the open check valves.

When I refer to a series of ports lengthwise of the cylinder such series must include a group of ports at such end of the cylinder as it is desired to retard and stop the piston and they may be at both ends and throughout all or any desired intermediate part of the cylinder. All such arrangements are contemplated in such reference to a series of ports lengthwise of the cylinder.

I have chosen to illustrate my invention as embodied in a cylinder in which the piston has a rectilinear movement as such pistons are more easily packed, but it is obvious that the adaptation of my invention to various uses may make it desirable for the piston to have travel in its cylinder otherwise than in a rectilinear direction and such is contemplated in my claims wherein the reference to the by-pass ports being lengthwise of the cylinder is intended to broadly cover any arrangement thereof in the cylinder so that they are successively passed by the piston as it travels back and forth.

Having thus described my invention, what I claim as new and desire to secure by Letters Patent, is:—

1. In a device of the character described, a cylinder having a series of ports lengthwise thereof and a by-pass with which said ports communicate, a check valve controlling a port at one end of the cylinder, and a piston movable in the cylinder and adapted to control its terminal movements by automatically varying the port area for the by-passing of fluid around it.

2. In a device of the character described, a cylinder having a series of ports lengthwise thereof, ports at each end controlled by check valves, a by-pass connecting the several ports, and a piston movable in the cylinder and adapted by the closing of the ports and the automatic operation of the check valves to automatically control its terminal movements.

3. In a device of the character described, a cylinder adapted to contain a body of liquid, a series of by-pass ports extending lengthwise thereof, a by-pass connecting said ports and the ends of the cylinder, and check valve means adapted to permit a free discharge into the by-pass of the fluid ahead of the moving piston.

4. In a device of the character described, a cylinder having ports arranged lengthwise thereof, a piston movable in the cylinder and adapted to open and close said ports as it travels, a by-pass connecting the ends of the cylinder and said ports for by-passing the fluid about the piston, and supplemental means responsive to pressure in the cylinder and operable to permit a free escape of the fluid under pressure from the cylinder ends to the by-pass independently of said ports.

5. In a device of the character described, a cylinder having at each end a relief port and an outwardly opening check valve therein, a series of by-pass ports extending lengthwise of the cylinder between the first mentioned ports, a by-pass connecting all said ports, and a piston movable pressure tight in the cylinder over all but the end by-pass port.

6. In a shock absorber, a liquid containing cylinder having a fluid tight piston movable therein, a series of lengthwise by-pass ports, a by-pass connecting said ports, and means to bring the pressure of the fluid in advance of the piston as it moves in either direction forward or back under the control of the varying cross-sectional area of the open ports behind the moving piston.

7. In a shock absorber, a liquid containing cylinder having a fluid tight piston movable therein, a series of lengthwise by-pass ports, a by-pass connecting said ports, and means to bring the pressure of the fluid in advance of the piston as it moves in either direction forward or back under the control of the varying cross-sectional area of the open ports ahead of the moving piston.

8. In a device of the character described, a cylinder having a longitudinal series of by-pass ports, a piston movable fluid tight in the cylinder over said ports, a by-pass connecting the cylinder ends and the several ports, and valves interposed in said by-pass to segregate said ports into groups.

9. In a device of the character described, a cylinder having a longitudinal series of by-pass ports, a piston movable fluid tight in the cylinder over said ports, a by-pass connecting the cylinder ends and the several ports, valves interposed in said by-pass to segregate said ports into groups, and a supplemental valve controlled by-pass connecting the ends of the first mentioned by-pass.

10. In a device of the character described, a cylinder having a longitudinal series of by-pass ports, a piston movable fluid tight in the cylinder over said ports, a by-pass connecting the cylinder ends and the several ports, valves interposed in said by-pass to segregate the ports into groups, and a supplemental valve controlled by-pass connecting the ends of the first mentioned by-pass, the said piston being wide enough to cover all of the ports in an intermediate group as it passes over them.

11. In a device of the character described, a fluid containing cylinder having a plurality of spaced groups of ports arranged lengthwise thereof, a by-pass connecting the ports of said several groups with the ends of the cylinder, a valve interposed in said by-pass to segregate the ports into groups, a piston movable pressure tight in the cylinder and having a width in excess of the lineal length of any intermediate group of ports, a supplemental valve controlled by-pass connecting the ends of the first mentioned by-pass, and check valves communicating with said by-passes and the cylinder ends.

12. In a device of the character described, a fluid containing cylinder having a lengthwise series of by-ports, a by-pass connecting them with the cylinder ends, a piston movable over said ports, and check valves connecting the cylinder ends with the by-pass, said check valves comprising valve bodies which are adapted to be reversed to open either inwardly or outwardly from the cylinder.

13. In a device of the character described, a cylinder having by-passes for a body of fluid therein, a piston movable fluid tight therein, a liquid supply tank connected with the cylinder, and an inwardly opening check valve adapted to permit the escape of air from the cylinder and its replacement by liquid from the reservoir automatically, substantially as described.

14. In a shock absorber, an element movable from initial position in either direction responsive to the movements of the body to be controlled, and means to offer a gradually decreasing resistance to the movement of said element in either direction from initial toward a terminal position and a like decreasing resistance on its return movement toward the other terminal position.

15. In a shock absorber, an element movable in either direction from initial position responsive to the movements of the body to be controlled, and means to oppose the movements of said element with gradually decreasing resistance as the element moves in either direction, said means being adapted to increase the initial resistance proportionately to the force tending to displace said element.

16. In a shock absorber, an element movable back and forth with the body to be controlled, and means adapted to offer a gradually decreasing resistance to said element as it moves in either direction from any given position.

17. In a shock absorber, an element movable back and forth with the body to be controlled, and means adapted to offer a gradually decreasing resistance to said element as it moves in either direction from any given position, said resistance continuing to decrease throughout the element's travel in any given direction.

18. In a shock absorber, an element movable back and forth with the body to be controlled, and means adapted to offer a gradually decreasing resistance to said element's return after a movement from any position in either direction, such resistance initially being greater in direct proportion to the length of movement from said position.

19. In a shock absorber, a cylinder having a lengthwise series of relatively small ports between relatively large end check valve ports, a by-pass connecting said ports, a check valve controlling each check valve port and adapted, when open, to freely pass through its ports all fluid flowing into or from the by-pass through said intermediate ports, a piston movable over said intermediate ports to successively close them, and a body of substantially incompressible fluid entirely filling said cylinder and by-pass.

In testimony whereof I affix my signature.

WILLIAM R. COLEMAN.